UNITED STATES PATENT OFFICE.

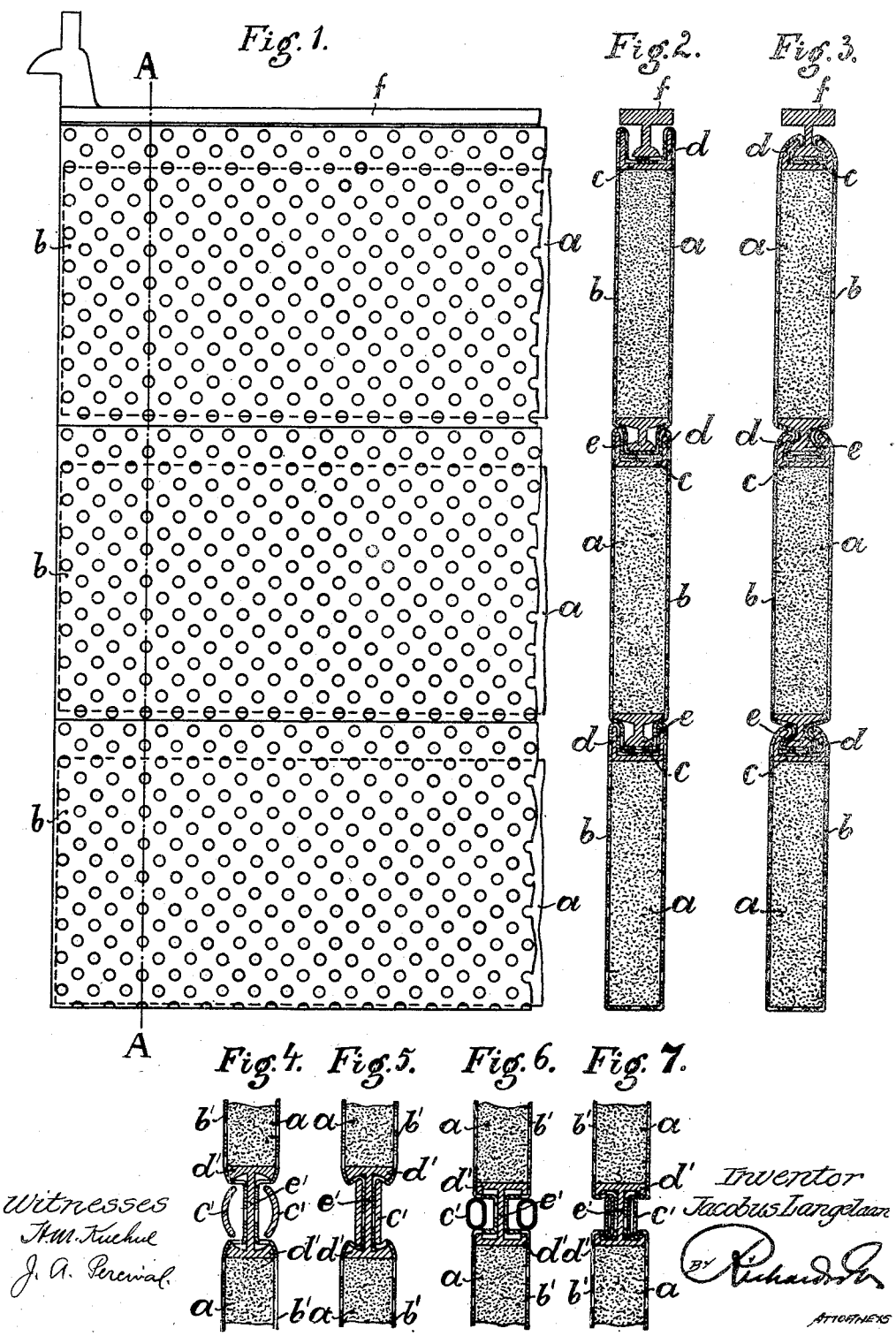

JACOBUS LANGELAAN, OF OBERSCHÖNEWEIDE, NEAR BERLIN, GERMANY, ASSIGNOR TO PFLÜGER ACCUMULATOREN - WERKE ACTIENGESELLSCHAFT, OF BERLIN, GERMANY.

SECONDARY BATTERY.

No. 796,435.     Specification of Letters Patent.     Patented Aug. 8, 1905.

Application filed February 27, 1905. Serial No. 247,605.

*To all whom it may concern:*

Be it known that I, JACOBUS LANGELAAN, director, a subject of the Queen of the Netherlands, residing at Oberschöneweide, near Berlin, Germany, have invented new and useful Improvements in Secondary Batteries, of which the following is a specification.

The present invention relates to plates of the active mass for secondary batteries which are composed of single pieces and inclosed and held together by a protective envelop.

The invention consists of a special mode of constructing the parts of the plate supporting the separate pieces, which construction secures the protective envelop at certain intervals and also holds the strips of active material firmly and connects one with another. In this construction there are provided a number of horizontal supports provided with flanges, on the one hand, and connecting-pieces, on the other, which connecting-pieces engage between the flanges of the supports upon the bent parts of the protective envelop. The supports, connecting-pieces, and protective envelop are united one to the other at the connecting-points of the separate strips of active mass by folding.

The new active-mass plate is illustrated in the accompanying drawings in certain constructional forms as follows:

Figure 1 shows a portion of the plate in elevation. Figs. 2 and 3 are sections on the line A A and show the form of the various parts before and after the folding.

Whereas according to Figs. 1, 2, and 3 U-shaped connecting-pieces and T-shaped supports are made use of, according to Figs. 4 and 5 and also 6 and 7, I-shaped supports and connecting-pieces are used, which become wider on folding, and thereby secure the fastening of the protective envelop and the connection of the separate pieces. Figs. 4 and 6 again show sections before the folding and Figs. 5 and 7 after the folding.

According to Figs. 1 to 3 three strips of active material $a$, of which also each one in itself consists of several pieces, are arranged one above another. Around the lower strip of active material $a$ is placed a perforated metal plate $b$, which engages above around the flange $d$ of the U-shaped connecting-piece $c$. Also the middle and the upper strips of active material $a$ are each surrounded by a perforated metal plate $b$. Further, the metal plate $b$ incloses underneath a T-formed support $e$ and above, again, a U-formed connecting-piece $c$. The lower limb of the support $e$ engages between the flanges $d$ of the connecting-piece $c$ upon the bent parts or edges of the perforated plate $b$. The uppermost support $e$ has its upper limb $f$ thickened, so as to serve as a support and current-conductor. After the active strips are assembled one to another in the above-described manner the connecting-places are folded, whereupon a unitary whole is obtained in the manner shown in Fig. 3.

According to Figs. 4 to 7 a single protective envelop may be used for all the strips of active material. In this case the flanges $d'$ of the supports $e'$ lie between the separate strips of active mass, and said flanges are farther apart than in the construction shown in Figs. 2 and 3. On each side of the support the plate $b'$ is pressed in between the flange $d'$ and then a connecting-piece $c'$, of arc-shaped, Fig. 4, or annular-shaped, Fig. 6, section inserted. If in this constructional form the connecting portions of the connecting-pieces, supports, and protective envelop are folded, then the connecting-pieces become wider and hold in this manner firmly the plate $b'$, serving as protective envelop, between the flanges $d'$ of the support $e'$. Obviously the supports $e'$ and the connecting-pieces $c'$ might have other sections. Also it is not indispensably necessary that a single sheet of metal be made use of for all the strips of active material, as shown in Figs. 4, 5, 6, and 7. It is much more important that the connecting portions of the supports provided with flanges placed between the separate pieces of active material, the protective envelop, and the connecting-pieces engaging between the flanges of the supports upon the bent-over sheet-metal parts of the protective envelop should be so folded that the pieces or strips of active material, the supports, the connecting-pieces, and the protective envelop should all be connected together into one unitary whole.

Having now described my invention and in what manner the same is to be performed, what I claim, and desire to secure by Letters Patent, is—

In secondary-battery plates, comprising a number of separate pieces of active material united together and surrounded by a protective envelop, the combination with horizontal supports, which are provided with flanges, of connecting-pieces, embracing said envelop and supports.

In testimony whereof I have signed my name to this specification in the presence of two subscribing witnesses.

JACOBUS LANGELAAN.

Witnesses:
  WOLDEMAR HAUPT,
  HENRY HASPER.